Figure 1:
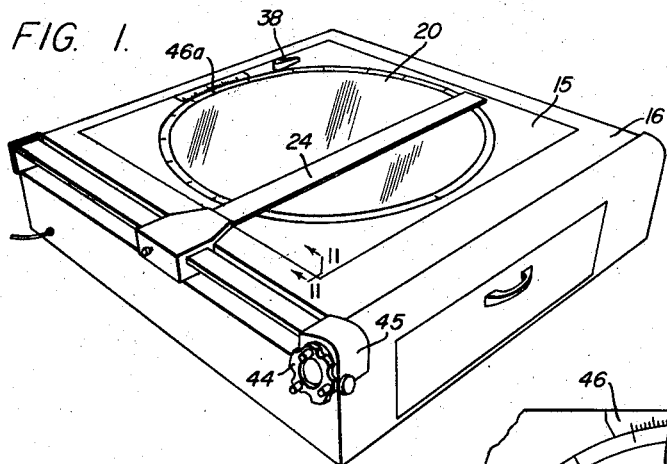

Oct. 14, 1958  R. S. SHELLY  2,855,721
RULING LAYOUT TABLE

Filed Feb. 25, 1957  2 Sheets—Sheet 1

INVENTOR:
ROBERT S. SHELLY,
BY
ATTORNEYS.

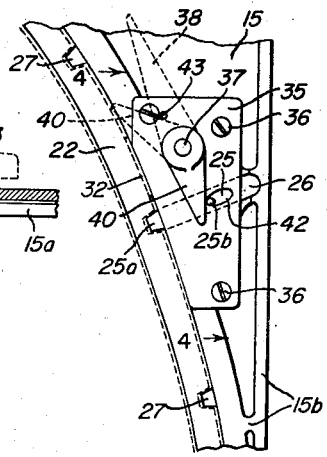

United States Patent Office 2,855,721
Patented Oct. 14, 1958

2,855,721

RULING LAYOUT TABLE

Robert S. Shelly, Logan, Utah, assignor to Pack Manufacturing Company, Logan, Utah, a corporation of Utah Application February 25, 1957, Serial No. 642,044

9 Claims. (Cl. 45—131)

This invention relates to equipment for ruling lines on work sheets, and is concerned particularly with such equipment wherein the work sheet may be rotated to any desired angle relative to the ruling straight-edge.

In my copending application Serial No. 473,644, filed December 7, 1954, entitled "Parallel Ruling Apparatus for Layout or Register Tables," I have disclosed ruling apparatus in the nature of a ruling layout table for use in preparing a variety of ruled forms and similar layouts. Provision is made for accurately moving a straight-edge forwardly and backwardly across a table surface in various selective, predetermined increments, so that ruling and layout work can be accomplished precisely and expeditiously.

The principal object of my present invention is to provide a table construction for such apparatus that enables the work sheet to be quickly and easily rotated through precisely determined angles relative to the straight-edge and to be securely locked in any so adjusted position, without disturbing the initial register between straight-edge and work sheet.

A feature of the invention is the provision of turn-table structure within the layout table proper, such structure furnishing a rotatable work surface underlying the forward and backward sweep of the straight-edge.

Another feature is the provision of a vernier scale between the turn-table and the table proper, whereby great accuracy is possible in the setting of the turn-table in any desired position relative to the straight-edge.

Other features reside in the mechanical arrangements made for both latching and locking the turn-table in various adjusted positions and for releasing it from any such position for turning to a new position.

Further objects and features of the invention will become apparent from the following detailed description of the particular preferred embodiment illustrated by way of example in the accompanying drawings.

Figure 2:
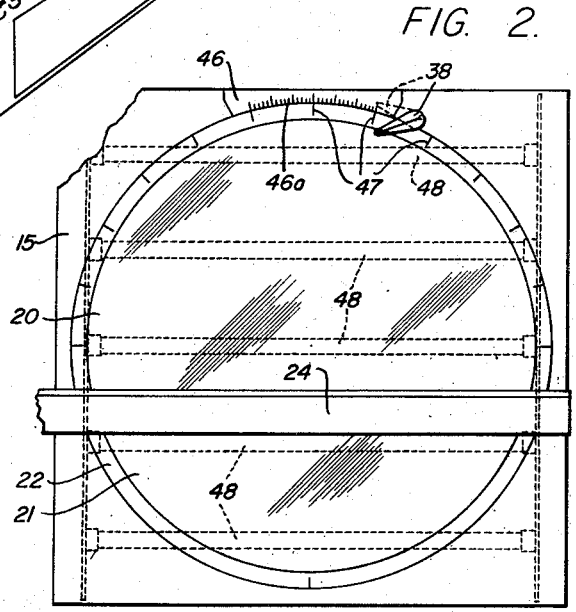
Figure 3:
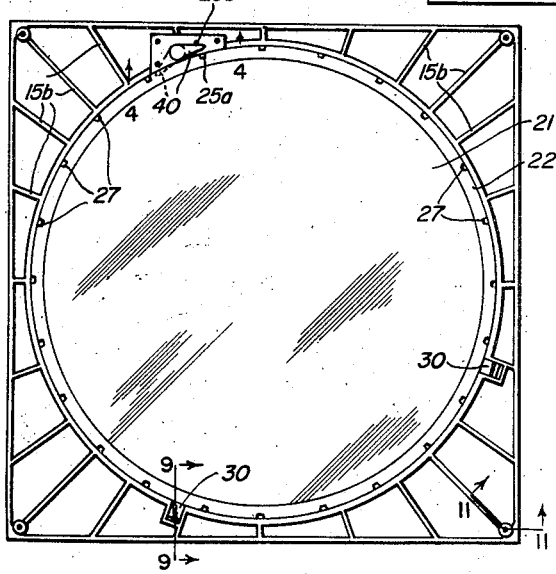

In the drawings:

Fig. 1 represents a perspective view of the structure of the invention as incorporated in a ruling layout apparatus conforming to my aforementioned copending application for patent, the turn-table being locked in a predetermined, latched working position;

Fig. 2, a fragmentary top plan view of the layout table portion of the apparatus of Fig. 1, the turn-table being unlocked but still latched, the unlatching position of the manipulating handle being indicated by broken lines;

Fig. 3, a bottom plan view of the table structure, the mechanism being shown in the latched but unlocked position of Fig. 2, and the locked position being indicated by broken lines;

Fig. 4, a vertical section taken on the line 4—4 of Figs. 3 and 5, drawn to a considerably enlarged scale over that of the preceding figures and showing the structure concerned in upright, working position, the locked position being again indicated by broken lines;

Fig. 5, a fragmentary bottom plan taken from the standpoint of the line 5—5 of Fig. 4, the locked position still being indicated by broken lines;

Fig. 6, a fragmentary horizontal section taken on the line 6—6 of Fig. 4, the locked position not being indicated here, it being remembered that this is the latched position of the mechanism;

Fig. 7, the view of Fig. 6, but showing the unlatched position of the mechanism;

Fig. 8, a fragmentary vertical section taken on the line 8—8 of Figs. 4 and 6, and being shown in the upright, working position of Fig. 4;

Fig. 9, a fragmentary vertical section taken on the line 9—9 of Figs. 3 and 10, drawn to the enlarged scale of Figs. 4-8 and presenting the same upright, working position;

Fig. 10, a fragmentary bottom plan taken from the standpoint of line 10—10 of Fig. 9;

Fig. 11, a view similar to that of Fig. 9, but taken on the line 11—11 of Figs. 1, 3, and 12, so as to show details of the attachment of the layout table proper to the housing of the complete ruling apparatus; and Fig. 12, a view similar to that of Fig. 10, but taken from the standpoint of the line 12—12 of Fig. 11.

Referring to the drawings:

In the form illustrated, the layout table proper 15 is inset into the housing 16 of the ruling apparatus of Fig. 1 on a peripheral seat 16a, Figs. 11 and 12, and is held tightly in place by means of screw and wing nut assemblies 17 acting on respective clamping pieces 18 which bear directly against respective yieldable pads 19 of felt or the like.

Inset within a circular receiving aperture provided preferably centrally of the layout table proper 15 is a circular turn-table 20. Such turn-table rests freely upon a recessed and circular seat 15a which defines the receiving aperture, and is freely rotatable thereon by rotational sliding movement relative thereto. Thus, it may be turned from one position to another by the hands of a user pressed flatwise thereagainst.

The layout table proper 15 is advantageously die cast from a suitable metal, and is ribbed at its underside, as at 15b, Figs. 3, 5, and 12, for the sake of structural strength.

The turn-table 20 comprises a circular and preferably translucent plate or table insert member 21 of a suitable rigid material, such as glass, inset within a rigid rim member 22, see particularly Fig. 8, which is formed with an inner circumferential seat 22a for the purpose. Such plate or table insert member 21 is immovably joined to the rim member 22 by means of a suitable rigid-set adhesive material 23 adherent to both members.

In the use of the apparatus, a work sheet to be ruled (not shown) is placed directly upon the plate 21, where it underlies the straight-edge 24, Figs. 1 and 2, and the forward and backward sweep of same. The sheet may be held by "Scotch" tape.

For the purpose of enabling the turn-table 20 to be turned to any one of a number of predetermined positions, and to thus orient the thereto temporarily attached work sheet to respectively different angular relationships with the straight-edge 24, there is provided latch mechanism effective between the stationary layout table proper and the rim of the turn-table.

In the present preferred form, such latch mechanism comprises a latch bolt 25 directed toward the rim of the turn-table and mounted for forward and backward sliding movement within a slideway 26 formed in the undersurface of layout table proper 15. Its tapered tip 25a is adapted to fit into any one of a number of mutually spaced keeper recesses or notches 27 formed in the outer periphery and at the underside of rim member 22.

A single leaf spring 28, inset into the undersurface of layout table proper 15 within a receiving recess 29, has a tip member projecting into a suitable receiving notch in latch bolt 25, so as to normally urge such latch bolt toward and against rim member 22 of the turn-table and into engagement with one or another of the keeper recesses 27 thereof, see Fig. 3. By making each keeper recess somewhat deeper than the latch tip is long, tight seating of the latter is assured despite wear.

For the purpose of maintaining precise registry of the work sheet with the straight-edge 24 despite the free mounting of the turn-table and for insuring absolute immobility thereof during any given ruling operation, there is provided locking mechanism having means for forcing the turn-table into a predetermined precise location relative to the layout table proper upon each adjustment of such turn-table to a new work position.

In its present preferred form, this locking mechanism comprises a plurality of mutually spaced abutment shoes mounted in layout table proper 15 in mutually spaced relationship about rim member 22 of the turn-table. As here shown, such shoes include a pair of adjustable reaction blocks 30, Figs. 3, 9, and 10, of brass or other suitable bearing material mounted in respective slideways 31, and a locking block 32, Figs. 4–8, of similar material mounted in a desirably oversized slideway 33 closely associated with the latching mechanism.

Slideways 31 are formed in the layout table proper 15 at the undersurface thereof, and respective screw and wing nut assemblies 34 are employed to clamp the reaction blocks 30 tightly in any adjusted position thereof relative to the rim of the turn-table 20, it being understood that the screws of such assemblies 34 pass through respective accommodating slots 30a, Fig. 9, provided in the blocks 30 for that purpose.

Slideway 33 for locking block 32 is also provided at the undersurface of layout table proper 15, but immediately adjacent to latch bolt slideway 26. Locking block 32, latch bolt 25 and spring 28 are all retained in their respective slideways and recess by means of a plate 35 secured thereover by screws 36, see especially Figs. 5 and 8.

At least one of the abutment shoes of the locking mechanism, here represented by locking block 32, is provided with manually controlled means for forcing it toward and away from the rim of turn-table 20 and for, coincidentally, forcing such turn-table into tight frictional abutting engagement with the others of such abutment shoes. Also, the latching mechanism is provided with means for retracting latch bolt 25 against the urge of spring 28. Advantageously, and as here shown, the manually controlled means are shared in common by the locking and latching mechanisms.

Thus, a cam shaft 37 passes through suitable accommodating apertures, see Fig. 8, in layout table proper 15, locking block 32, and retainer plate 35, and carries at its upper end a manually controlled handle 38, intermediate its ends and within locking block 32 an eccentric cam member 39, and at its lower end an actuating arm 40. Cam member 39 is preferably integral with the shaft 37, but both handle 38 and arm 40 are preferably adjustably positioned thereon by means of respective set screws 41, Fig. 4.

A part of latch bolt 25, advantageously a pin member 25b, depends therefrom through slot 42, Fig. 5, in retainer plate 35 and into the path of movement of actuating arm 40. Handle 38 and arm 40 are preferably secured to cam shaft 37 in the set positions relative to each other and to cam member 39 indicated in Fig. 7, so that the turn-table is unlocked in the latched and unlatched positions of Figs. 6 and 7, respectively, but locked in the broken-line position of Fig. 5, where actuating arm 40 is indicated in the limit-stop position established by an abutment pin 43 depending rigidly from retainer plate 35.

In using the ruling apparatus of Fig. 1, which is shown as being locked in a selected latched position, the straight-edge 24 is moved up and down across the work surface of turn-table 20 by manipulating handwheel 44 of indexing head 45, as fully explained in my aforementioned copending application Serial No. 473,644.

When it is desired to rule lines at an angle to the work sheet as initially set up, neither the straight-edge nor the work sheet itself need be moved. It is only necessary to swing handle 38 from the locked position of Fig. 1 to the unlatching position indicated by broken lines in Fig. 2 and to rotate turn-table 20 to the desired new position, whether that be a new one of the several most used and latch-provided positions corresponding to the keeper recesses 27, respectively, or some non-latching position therebetween. At such new position, the handle 38 is swung back to the locked position of Fig. 1, where the locking shoe block 32 forces turn-table 20 against the pair of fixed reaction shoe blocks 30, which establishes the work registry location for the turn-table in any and all of its adjusted positions relative to the layout table proper and the straight-edge.

To enable turn-table 20 to be turned to a precise new position, a scale plate 46, Fig. 4, marked with a vernier scale 46a, Figs. 1 and 2, is inset into layout table proper 15, as illustrated, for co-operation with scale markings 47 on turn-table rim 22.

To facilitate the ruling operation, it is advantageous that an electric light, for example the fluorescent light tubes 48, be mounted within the housing 16 of the apparatus so as to illuminate the translucent work table 21 from below.

Whereas this invention is here illustrated and described with respect to a specific embodiment thereof, it should be realized that changes may be made within the scope of the following claims, without departing from the essential contributions to the art made by the teachings hereof.

I claim:

1. In ruling apparatus equipped with a layout table including a layout table proper and a work supporting turn-table freely inset into said table proper and rotatable relative thereto, said apparatus having latching mechanism establishing various predetermined work positions for said turn-table, the improvement comprising, locking mechanism for precisely positioning and securely retaining the turn-table in any given work position, said locking mechanism including a plurality of abutment shoes mounted in the layout table proper in mutually spaced relationship about the rim of the turn-table and in frictional engaging relationship with said rim; manually controlled means operably associated with at least one of said shoes for forcing it toward and away from said rim and for, coincidentally, forcing the turn-table into tight frictional abutting engagement with the others of said shoes; and means for positionally adjusting said others of the shoes radially of said turn-table, whereby the turn-table is forced into a predetermined precise location relative to the table proper upon each adjustment of the turn-table to a new work position.

2. The combination of claim 1, wherein the said one shoe is confined in a slideway that serves to guide its movement; and the manually controlled means comprises a cam shaft journaled in the table proper and having a cam operably associated with the said one shoe for moving the latter as the cam shaft is turned, and a handle secured to the cam shaft.

3. The combination of claim 2, wherein the latching mechanism comprises a latch bolt, resilient means normally urging said bolt toward the rim of the turn-table, and means actuated by the cam shaft for retracting the bolt against the urge of said resilient means.

4. The combination of claim 3, wherein the keeper means comprise a plurality of mutually spaced, bolt-receiving recesses in the rim of the turn-table.

5. In ruling apparatus equipped with a layout table, the combination, with the layout table proper, of a work supporting turn-table freely inset into said table proper and rotatable relative thereto; latching mechanism establishing various predetermined work positions for said turn-table; and locking mechanism for securely retaining the turn-table in any given work position, said locking mechanism including positioning means for forcing the turn-table into a predetermined precise location relative to the table proper upon each adjustment of the turn-table to a new work position, said turn-table and said layout table proper being vernier scaled relative to each other.

6. The combination of claim 5, wherein the turn-table comprises a circumferential, scaled rim member and a translucent table insert member therefor, said rim member being formed with an inner circumferential seat upon which the said table insert member is positioned in inset relationship with the rim member, and rigid-set adhesive material adherent to both said rim member and said table insert member, immovably joining the latter to the former; and wherein lighting means are provided below said table insert member.

7. The combination of claim 6, wherein the layout table proper is provided, intermediate its length and breadth, with a recessed, circular seat defining a receiving aperture for the turn-table; and the turn-table fits into said receiving aperture and rests freely thereon for rotational sliding movement relative thereto.

8. In ruling apparatus equipped with a layout table, the combination, with the layout table proper, of a work supporting turn-table freely inset into said table proper and rotatable relative thereto; latching mechanism establishing various predetermined work positions for said turn-table and comprising a latch bolt, resilient means normally urging said bolt toward the rim of the turn-table, and means for retracting the bolt against the urge of said resilient means; and locking mechanism for securely retaining the turn-table in any given work position and for forcing it into a predetermined precise location relative to the table proper upon each adjustment of the turn-table to a new work position, said locking mechanism comprising a plurality of abutment shoes mounted in the layout table proper in mutually spaced relationship about the rim of the turn-table and in frictional engaging relationship with said rim, at least one of said shoes being provided with manually controlled means for forcing it toward and away from said rim and for, coincidentally, forcing the turn-table into tight frictional abutting engagement with the others of said shoes, the said one shoe being confined in a slideway that serves to guide its movement, and the said manually controlled means comprising a cam shaft journaled in the table proper and having a cam operably associated with the said one shoe, for moving the latter as the cam shaft is turned, and a handle secured to the cam shaft, the bolt-retracting means of the said latching means comprising an arm secured to said cam shaft and extending into engageable relationship with a part of the latch bolt.

9. The combination of claim 8, wherein the latch bolt is inset within a slideway formed in the undersurface of the table proper and the said part of the latch bolt is an abutment member depending therefrom; the resilient means is a leaf spring recessed in the undersurface of the table proper and extending into said slideway and into engagement with said bolt; and a plate is secured over the said one shoe slideway, the latch bolt slideway, and the recessed spring, so as to retain said one shoe, said latch bolt, and said spring in place, said plate being apertured to accommodate said abutment member, the cam shaft extending through and depending from said plate, the bolt-retracting arm being secured to the depending portion of the cam shaft so as to sweep across the lower face of the plate and engage and push against said abutment member when the cam shaft is turned, and the opposite portion of the cam shaft projecting upwardly from the upper surface of the table proper and having the manipulating handle secured thereto.

References Cited in the file of this patent

UNITED STATES PATENTS

| | | |
|---|---|---|
| 324,855 | Leonard | Aug. 25, 1885 |
| 386,072 | Huyett | July 10, 1888 |
| 564,840 | Poole | July 28, 1896 |
| 824,966 | Werner | July 3, 1906 |
| 1,440,993 | Hasbruck | Jan. 2, 1923 |
| 2,414,606 | Page | Jan. 21, 1947 |
| 2,708,328 | Bryda | May 17, 1955 |